United States Patent
Chiang

(10) Patent No.: US 8,588,602 B2
(45) Date of Patent: Nov. 19, 2013

(54) AUTO FOCUS MODULE OF IMAGE CAPTURE DEVICE

(75) Inventor: Cheng-Nan Chiang, Taichung (TW)

(73) Assignee: Ability Enterprise Co., Ltd, Taipei (TW)

( * ) Notice: Subject to any disclaimer, the term of this patent is extended or adjusted under 35 U.S.C. 154(b) by 114 days.

(21) Appl. No.: 13/114,700

(22) Filed: May 24, 2011

(65) Prior Publication Data

US 2012/0141103 A1 Jun. 7, 2012

(30) Foreign Application Priority Data

Dec. 3, 2010 (TW) .............................. 99142144 A

(51) Int. Cl.
G02B 7/04 (2006.01)
(52) U.S. Cl.
USPC .......................................................... 396/144
(58) Field of Classification Search
USPC .......................................................... 396/144
See application file for complete search history.

(56) References Cited

U.S. PATENT DOCUMENTS

| 7,798,731 | B2 * | 9/2010 | Kurosawa | 396/505 |
| 8,041,204 | B2 * | 10/2011 | Nomura | 396/75 |
| 8,285,136 | B2 * | 10/2012 | Tsujiyama | 396/260 |
| 2005/0286352 | A1 * | 12/2005 | Inui | 369/44.11 |
| 2009/0120223 | A1 * | 5/2009 | Nomura et al. | 74/411 |

FOREIGN PATENT DOCUMENTS

| CN | 2938165 Y | 8/2007 |
| JP | 2009-169285 | 7/2009 |
| TW | 370203 | 9/1999 |

* cited by examiner

*Primary Examiner* — Rochelle-Ann J Blackman
*Assistant Examiner* — Linda B Smith
(74) *Attorney, Agent, or Firm* — Muncy, Geissler, Olds & Lowe, PLLC

(57) ABSTRACT

An auto focus module of an image capture device is provided. The auto focus module comprises at least one gear, a nut, a lead screw and a driver. The gear has at least one first extension and a first through hole. The nut has at least one second extension and a second through hole. The lead screw penetrates the first through hole and the second through hole. The driver drives the lead screw and the gear so that the lead screw and the gear move relatively along the axis of the lead screw. The nut and the gear terminate approaching toward each other after the first extension and the second extension lean against each other.

20 Claims, 4 Drawing Sheets

AUTO FOCUS MODULE OF IMAGE CAPTURE DEVICE

BACKGROUND OF THE INVENTION

1. Field of the Invention

The present invention generally relates to an auto focus (AF) module of an image capture device, and more particularly to an auto focus module which can prevent lens jamming resulting from malfunction.

2. Description of Related Art

Modern digital image capture devices are widely applied in digital cameras, digital video cameras, video lenses for home use or conference use etc. image sensors on a circuit board are integrated with a lens module to receive optical image signals and to transfer the optical image signals to electronic signals via photoelectric technologies to render optical images suitable for storage, identification and processing. Conventional auto focus lens module uses a stepping motor to drive a lens into a focus position. In order to proceed auto focus action, the lens must move in directions along a lens axis. In some unusual circumstances, such as malfunctions of the auto focus lens module or failures of lens position detectors, the lens of the auto focus lens module would continue moving over the predetermined stop position until the lens jams such that even the stepping motor driving the lens in a reverse direction can not release the lens from jamming resulting in malfunction of the auto focus lens module and render the auto focus lens module unable to focus.

The invention provide an auto focus module which can prevent the lens from jamming resulting from malfunction to resolve the problem of lens jamming caused by the malfunctions or unstable condition of lens position sensors and controller

SUMMARY OF THE INVENTION

An object of the present invention is to provide an auto focus module which can prevent the lens from being jammed due to malfunction through altering the direction of the contact force so as to avoid the lens frame being stuck owing to the snaps between the screw threads of the components of the auto focus module.

According to the object set forth, one embodiment of the present invention provides an auto focus module of an image capture device, the auto focus module of the image capture device comprises at least one gear, a nut, a lead screw and a driver. The gear has at least one first extension and a first through hole. The nut has at least one second extension and a second through hole. The lead screw passes through the first through hole of the gear and the second through hole of the nut. The driver drives the gear to drive the lead screw so as to move the nut along an axis of the lead screw, wherein the nut and the gear stop approaching to each other through the contact between the first and second extensions.

Another embodiment of the present invention provides an auto focus lens module, the auto focus lens module comprises a lead screw, a gear set and a nut. The gear set includes a gear having at least one first extension configured to the lead screw. The nut is disposed on the lead screw and has at least one second extension configured toward the first extension. The gear set drives the lead screw and the gear to move the nut along an axis of the lead screw, the nut stops approaching the gear through the contact between the first and second extensions along tangent directions of the rotation circles of the gear or the nut.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DETAILED DESCRIPTION OF THE INVENTION

The detailed description of the present invention will be discussed in the following embodiments in accordance with corresponding drawings which are not intended to limit the scope of the present invention, but can be adapted for other applications. Beside the detailed description, the invention can be made and performed by other replacement, modified and equivalent embodiments which are included in the scopes of the invention and the claims. In the description of the present invention, a plurality of detailed features are provided to enable one with ordinary skill in the art to make and use the invention. However, the invention can still be performed while some detailed features are omitted. Furthermore, well-known process steps or elements are not described in detail. While drawings are illustrated in details, it is appreciated that the scale of each component may not be expressly exactly.

Figure 1:
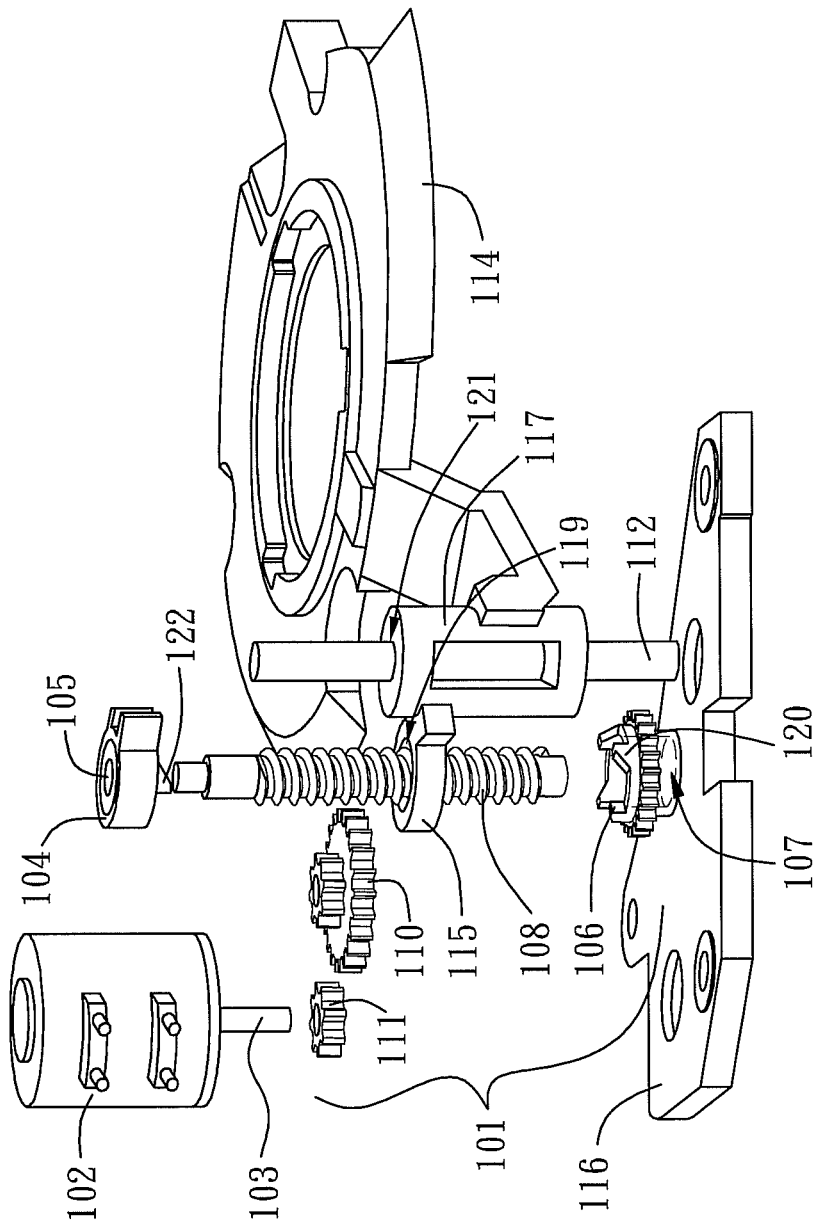
FIG. 1 shows a partial exploded view of an auto focus module of an image capture device according to one embodiment of the invention.

Referring to FIG. 1, a partial exploded view of an auto focus module 100 of an image capture device according to one embodiment of the invention is shown. The image capture device comprises digital cameras, and digital video cameras, but not limited to digital cameras and digital video cameras, any electronic device having auto focus lens module is included.

As shown in FIG. 1, the auto focus module 100 includes a driver 102, a nut 104, gears 106 and 110, a lead screw 108, a lens axis 112, a lens frame 114 and a base 116. The driver 102 may be a stepping motor, while the nut 104 and the gear 106 have extensions 120 and 122 and through holes 107 and 105 respectively. The extension 120 of the gear 106 and the extension 122 of the nut 104 are toward each other. The lead screw 108 is through the through holes 107 and 105 of the gear 106 and the nut 104, wherein the lead screw 108 and the gear 106 can be combined through any known configuration to rotate synchronously. The lead screw 108 has a screw thread matching with an inside screw thread (not shown) of the nut 104 so that the lead screw 108 rotates synchronously with the gear 106 when the gear 106 is drove by the driver 102, while the nut 104 moves along the axis of the lead screw 108. In a preferred embodiment, the driver 102 drive the gear 106 so that the gear 106 and the lead screw 108 rotates synchronously to move the nut 104 along the axis of the lead screw 108. The moving directions of the nut 104 depend on the directions of rotation of the gear 106 and the lead screw 108. The lens frame 114 has a first extending portion 115 with a first opening 119 and a second extending portion 117 with a second opening 121. The lead screw 108 is also through the first opening 119 of the first extending portion 115 of the lens frame 114 so that the driver can drive the lens frame 114. The lens axis 112 is through the second opening 121 of the second extending portion 117 of the lens frame 114 so that the lens frame 114 can move along the axis of the lens axis 112. Therefore, the lens frame 114 will also synchronously move along the axis of the lens axis 112 and the lead screw 108 when the nut 104 moves along the axis of the lead screw 108. The lens of the auto focus module 100 is on the lens frame 114. The bear 116 bears the rotations of a rotational axis 103 of the driver 102, the lead screw 108 and a gear set 101 including the gears 106 and 110 and a gear 111. The lead screw 108 is parallel to the lens axis 112. It is to be appreciated that many well-known elements of the auto focus module 100 shown in FIG. 1 are omitted and the components in the figure are not arranged in the sequence of assembling. The omitted well-known features can be practiced by any related art and anyone with ordinary skill in the art can make and use the invention based on ordinary level of skill in the art.

In another embodiment, as mentioned above, the lead screw and the gear are combined as a single component (not shown) to rotate synchronously. The nut 104 and the gear of the component also have extensions respectively. The extension of the gear and the extension 122 of the nut 104 are also toward each other. As the driver 102 drives the component, the nut 104 moves along the axis of the lead screw of the component. The lead screw of the component is also through the first opening 119 of the first extending portion 115 of the lens frame 114 so that the driver can drive the lens frame 114. The lens frame 114 will synchronously move along the axis of the lens axis 112 and the lead screw of the component when the nut 104 moves along the axis of the lead screw.

Figure 2:
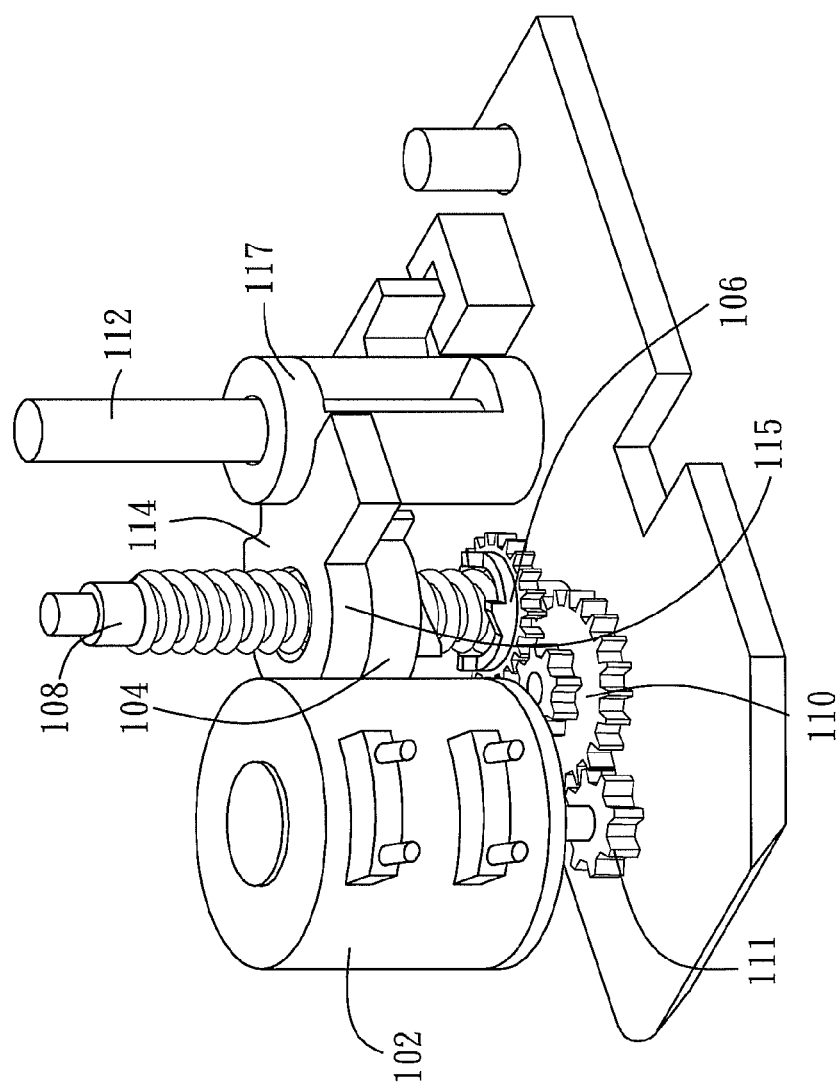
FIG. 2 shows a schematic view of the auto focus module shown in FIG. 1 after assembling according to one embodiment of the invention.

FIG. 2 shows a schematic view of the auto focus module 100 shown in FIG. 1 after assembling according to one embodiment of the invention. As shown in FIG. 2, one end of the rotational axis 103 of the driver 102 connects to the gear 111 so that the gears 106 and 110 of the gear set 101 will synchronously rotate to drive the lead screw 108 when the rotational axis 103 of the driver 102 rotates. The extension 120 of the gear 106 and the extension 122 of the nut 104 extend toward each other. The first extending portion 115 of the lens frame 114 is above the nut 104, and the nut 104 comprises a circular structure. The lead screw 108 is through the center of the circular structure so that the lens frame 114 will simultaneously move along the axis of the lead screw 108 and the lens axis 112 when the nut 104 moves along the axis of the lead screw 108. The second extending portion 117 of the lens frame 114 comprises a hollow cylindrical structure, and the lens axis 112 is through the center of the hollow cylindrical structure.

Figure 3:
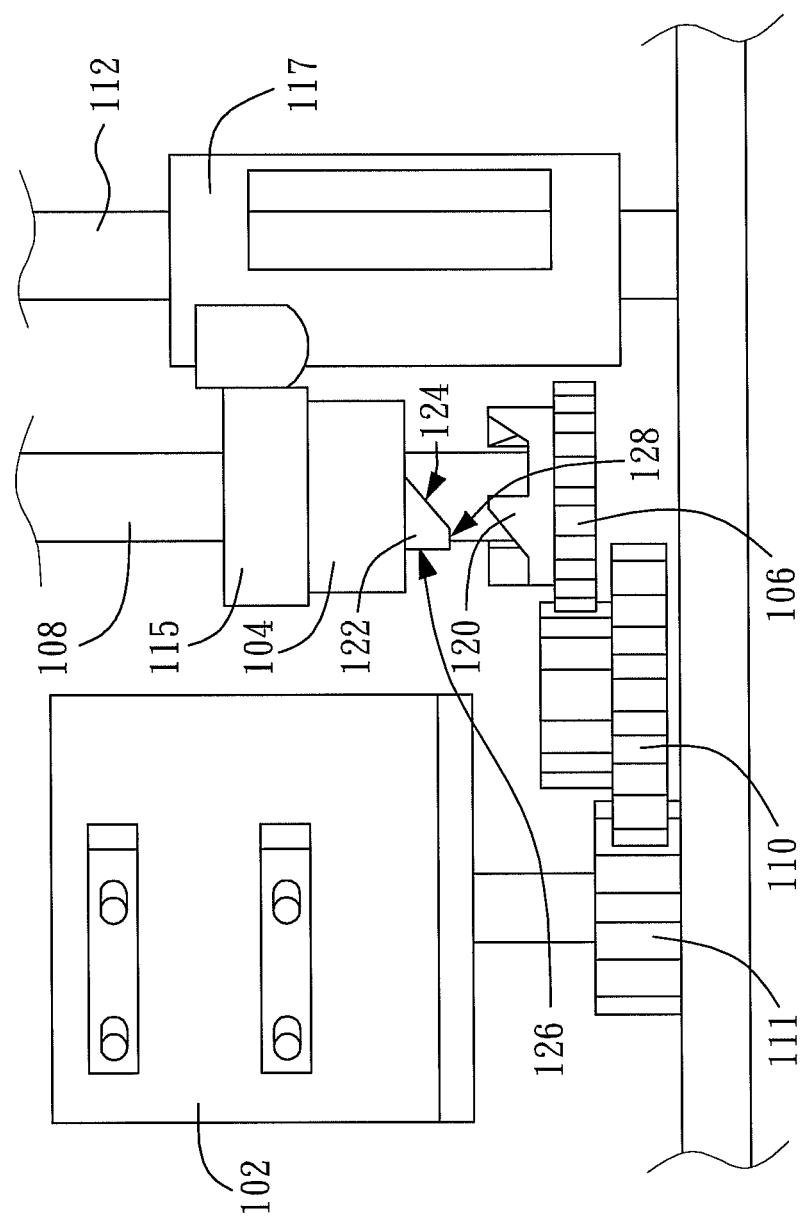
FIG. 3 shows a schematic view of the auto focus module during a normal operation condition according to one embodiment of the invention.

FIG. 3 shows a schematic view of the auto focus module 100 during a normal operation condition according to one embodiment of the invention. As shown in FIG. 3, the driver 102 will drive the gear set 101 to rotate the lead screw 108 so that the nut 104 moves along the axis of the lead screw 108 during the auto focus operation of the auto focus module 100. During a normal operation condition of the auto focus module 100, the extension 120 of the gear 106 and the extension 122 of the nut 104 will not contact or rub with each other, and there will be gaps between the extensions 120 and 122 so that the lens frame 114 will not be jammed resulting from the contact between the nut 104 and the gear 106. During a normal operation condition of the auto focus module 100, the moving status or position of the lens frame 114 along the axis of the lens axis 112 are detected by a photo interrupter (not shown) or other detector device. Moreover, the photo interrupter or detector device will emit signals when the lens frame 114 moves to a predetermined position of the photo interrupter or detector device along the lens axis 112 to interrupt the photo signal of the photo interrupter. Then the control unit of the image capture device will control the driver 102 according to the signals of the photo interrupter or detector device to stop driving the gear set 101 to rotate the lead screw 108 so as to stop the nut 104 and the lens frame 114 moving downward or toward the gear 106 and the base 116 to prevent the lens frame 114 from jamming due to the gear 106 contacting and rubbing with the nut 104.

Figure 4:
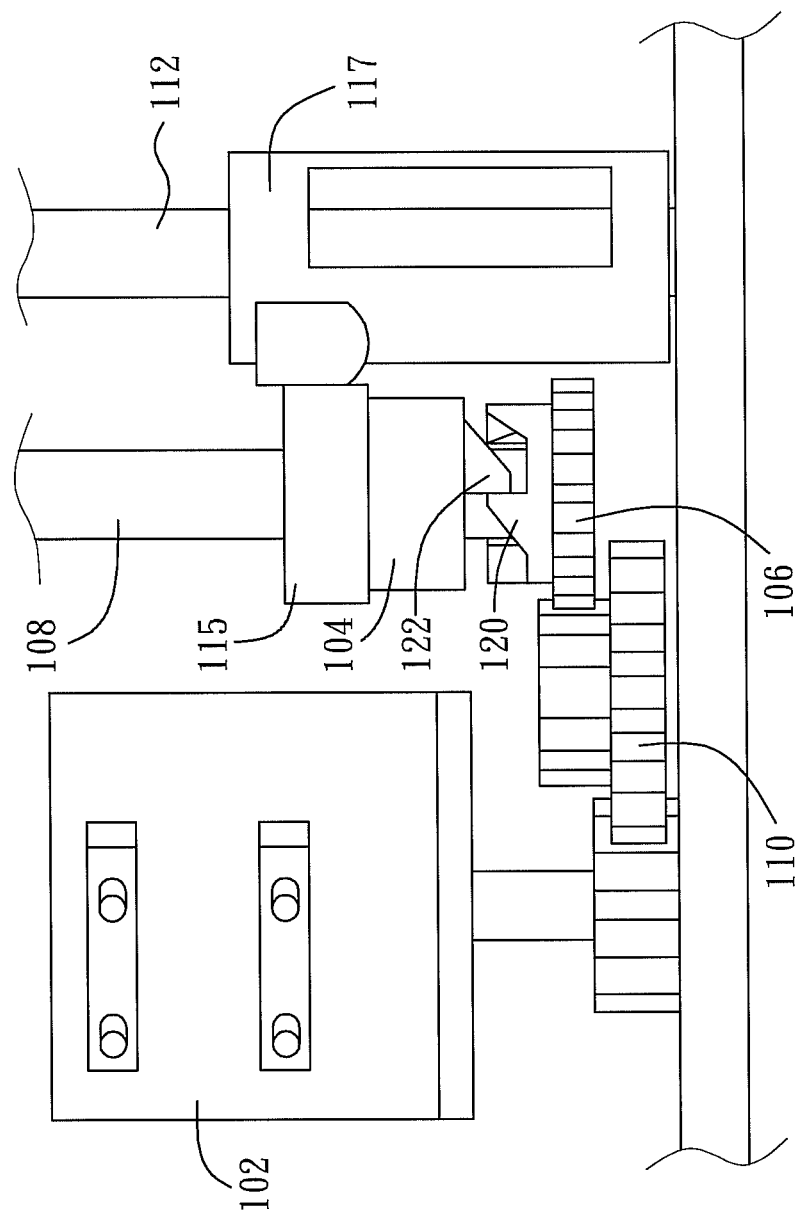
FIG. 4 shows a schematic view of the auto focus module during a malfunction operation condition according to one embodiment of the invention.

FIG. 4 shows a schematic view of the auto focus module 100 during a malfunction operation condition according to one embodiment of the invention. As shown in FIG. 4, when improper setting of sensitivity or malfunction of the photo interrupter or detector device occur, the control unit of the image capture device will control the driver 102 to continually drive the gear set 101 to rotate the lead screw 108 so as to drive the nut 104 and the lens frame 114 moving downward or toward the gear 106 and the base 116 until the extension 120 of the gear 106 contacts and rubs with the extension 122 of the nut 104. In one embodiment, the extensions 120 and 122 have incline surfaces 124, contact surfaces 126 and top portions 128 respectively. The extensions 120 and 122 rotationally contact with each other through the contact surfaces 126. The contact surfaces 126 preferably comprising a plane and can be vertical to the nut 104 and the gear 106 respectively. The incline surfaces 124 can be parallel to the screw thread of the lead screw 108. The incline surfaces 124 can be parallel to each other. The top portions 128 comprise arcs top portions, but are not limited to arcs top portions. Since the gear 106 and the nut 104 will be close to each other with contrary rotational directions and the extensions 120 and 122 will rotationally contact with each other through the contact surfaces 126, the nut 104 will not continually move toward the gear 106 even if the driver 102 continually drive the gear set 101 to rotate the lead screw 108 due to the side contact between the extensions 120 and 122. Since the nut 104 will move toward the gear 106 for a distance of a thread pitch when the nut 104 rotates for one circle, the incline surfaces 124 of the extensions 120 and 122 parallel to the screw thread of the lead screw 108 or the angles between the incline surfaces 124 and the surfaces of the gear 106 and the nut 104 smaller than the incline angle of the screw thread can prevent the incline surfaces 124 of the extensions 120 and 122 from contact or being stuck due to contact. The arc top portions of the extensions 120 and 122 can further prevent the top portions 128 of the extensions 120 and 122 from being stuck due to contact. The numbers of the extensions 120 and 122 could be the same or not. That is, the number of the extension 120 could be more than that of the extension 122, or the amount of the extension 122 could be larger than that of the extension 120. Particularly, if more than two extensions 120 are configured, the minimum height of the extension 120 can be decreased as the number of the extension 120 increase so as to meet the requirement of minimizing the volume occupied. Similarly, if more than two extensions 122 are provided, the minimum height of the extension 122 can be reduced as the number of the extension 122 increase so as to meet the requirement of minimizing the space occupied. The heights or lengths of the extensions 120 and 122 could be the same or different. That is, the lengths of the extensions 120 could be larger than those of the extensions 122, or the heights of the extensions 122 could be higher than that of the extension 120. Moreover, the lengths of the extensions 120 and 122 could be, but not limited to, multiples of the thread pitch of the lead screw 108. Regardless of the lengths, amount and shape of the extensions 120 and 122, the top portion 128 of the extension 120 can not contact the surface of the nut 104 perpendicular to the extension 122, while the top portion 128 of the extension 122 can not contact the surface of the gear 106 perpendicular to the extension 120. Since the extensions 120 and 122 of the gear 106 and the nut 104 will rotationally approach with each other as the nut 104 advances to the gear 106, the extensions 120 and 122 will contact laterally or along tangent directions of the rotation circles of the gear 106 or the nut 104 so as to convert the direction of the contact force between the gear 106 and the nut 104 from along axial direction of the lead screw 108 to along tangent directions of the rotation circles of the gear 106 or the nut 104, and thus the contact surfaces 126 of the extensions 120 and 122 will contact and apply forces against each other. The contact force will be transferred from the driver 102 to the gear 106 of the gear set 101 and the nut 104, and then finally to the lens axis 112 so that the screw threads of the nut 104 and the lead screw 108 will not "snap" with each other and the nut 104 and the lead screw 108 will not be stuck due to the axial applied force. Therefore, when the driver 102 reversely drives the gear set 101 to reversely rotate the lead screw 108, the gear 106 and the nut 104 can rotate in reverse directions respectively and render the nut 104 and the lens frame 114 gradually away from the gear 106 and the base 116 so as to prevent the lens frame 114 from being jammed resulting from the axial contact between the gear 106 and the nut 104.

The invention utilizes the extensions of the gear and the nut of an auto focus module to prevent the contact of the nut and the gear along the moving direction of the lens frame when the nut approaches the gear. Through the lateral contact or the contact along the tangent directions of the rotation circles of the gear or the nut so as to convert the direction of the force provided by the driver so that the lens frame will not be jammed owing to the snaps between the screw threads of the nut and the lead screw caused by the axial force from the nut against the gear.

Although specific embodiments have been illustrated and described, it will be appreciated by those skilled in the art that various modifications may be made without departing from the scope of the present invention, which is intended to be limited solely by the appended claims.

What is claimed is:

1. An auto focus module of an image capture device, comprising:
    at least one gear having at least one first extension and a first through hole;
    a nut having at least one second extension and a second through hole;
    a lead screw through the first through hole and the second through hole; and
    a driver for driving the gear to drive the lead screw so as to move the nut along an axis of the lead screw,
    wherein the nut and the gear stop approaching with each other through the contact between the first and second extensions.

2. The auto focus module of claim 1 further comprising a lens frame drove by the nut to focus along a lens axis.

3. The auto focus module of claim 1, wherein the first extension has a first contact surface and the second extension has a second contact surface, and the first extension and the second extension rotationally contact with each other via the first contact surface and the second contact surface.

4. The auto focus module of claim 3, wherein the first contact surface of the first extension is perpendicular to the gear and the nut.

5. The auto focus module of claim 3, wherein the second contact surface of the second extension is perpendicular to the gear and the nut.

6. The auto focus module of claim 1, wherein the first extension has a first incline surface, and the first incline surface is parallel to a screw thread of the lead screw.

7. The auto focus module of claim 1, wherein the second extension has a second incline surface, and the second incline surface is parallel to a screw thread of the lead screw.

8. The auto focus module of claim 1, wherein a height of the first extension is larger than a height of the second extension.

9. The auto focus module of claim 1, wherein the gear and the lead screw are combined as a signal component.

10. An auto focus lens module, comprising:
    a lead screw;
    a gear set including a gear having at least one first extension configured to the lead screw; and
    a nut for passing through the lead screw with at least one second extension configured toward the first extension,
    wherein the gear set drives the lead screw to rotate so that the nut moves along an axis of the lead screw, and the nut stops approaching the gear through the contact between the first and second extensions along a tangent direction of a rotation circle of the gear or the nut.

11. The auto focus lens module of claim 10, wherein the first extension has a first contact surface and the second extension has a second contact surface, and the first extension and the second extension rotationally contact with each other via the first and second contact surfaces.

12. The auto focus lens module of claim 11, wherein the first contact surface of the first extension is perpendicular to the gear and the nut.

13. The auto focus lens module of claim 11, wherein the second contact surface of the second extension is perpendicular to the gear and the nut.

14. The auto focus lens module of claim 11, wherein the first contact surface and the second contact surface comprise a plane respectively.

15. The auto focus lens module of claim 10, wherein the first extension has a first incline surface and the second extension has a second incline surface.

16. The auto focus lens module of claim 15, wherein the first incline surface is parallel to a screw thread of the lead screw.

17. The auto focus lens module of claim 15, wherein the second incline surface is parallel to a screw thread of the lead screw.

18. The auto focus lens module of claim 10 further comprising a lens frame drove by the nut to focus along a lens axis.

19. The auto focus lens module of claim 10, wherein a height of the first extension is larger than a height of the second extension.

20. The auto focus lens module of claim 10, wherein the gear and the lead screw are combined as a signal component.

* * * * *